US006804600B1

United States Patent
Uluyol et al.

(10) Patent No.: US 6,804,600 B1
(45) Date of Patent: Oct. 12, 2004

(54) SENSOR ERROR DETECTION AND COMPENSATION SYSTEM AND METHOD

(75) Inventors: Onder Uluyol, Fridley, MN (US); Emmanuel O. Nwadiogbu, Scottsdale, AZ (US)

(73) Assignee: Honeywell International, Inc., Morristown, NJ (US)

( * ) Notice: Subject to any disclaimer, the term of this patent is extended or adjusted under 35 U.S.C. 154(b) by 0 days.

(21) Appl. No.: 10/655,674

(22) Filed: Sep. 5, 2003

(51) Int. Cl.$^7$ ............................................... G05B 13/02
(52) U.S. Cl. ...................... 701/100; 123/479; 60/39.02; 702/104; 702/115; 700/29
(58) Field of Search ................................ 340/946, 836; 700/29; 60/204, 39.02, 39.33; 701/100, 101, 14, 113; 123/562, 179.3, 479; 307/10.6, 10.1; 702/104, 182, 115

(56) References Cited

U.S. PATENT DOCUMENTS

| | | | |
|---|---|---|---|
| 3,902,315 A | * 9/1975 | Martin | ...................... 60/39.091 |
| 4,058,975 A | 11/1977 | Gilbert et al. | |
| 4,161,101 A | 7/1979 | Drummond | |
| 4,212,161 A | 7/1980 | Newirth et al. | |
| 4,228,650 A | 10/1980 | Camp | |
| 5,497,751 A | * 3/1996 | Ohtake | ........................ 123/479 |
| 5,570,300 A | 10/1996 | Henry et al. | |
| 5,680,409 A | 10/1997 | Qin et al. | |
| 6,067,032 A | * 5/2000 | Anderson et al. | ........... 340/966 |
| 6,098,011 A | * 8/2000 | Scott | .......................... 701/100 |
| 6,298,718 B1 | 10/2001 | Wang | |
| 6,347,289 B1 | 2/2002 | VanderLeest | |
| 6,393,355 B1 | 5/2002 | Muramatsu | |
| 2004/0030417 A1 | * 2/2004 | Gribble et al. | ................. 700/29 |

FOREIGN PATENT DOCUMENTS

| | | | | |
|---|---|---|---|---|
| JP | 09257034 A | * | 9/1997 | ........... F16C/32/00 |
| SU | 569873 A | * | 9/1977 | ............. G01J/5/14 |

* cited by examiner

*Primary Examiner*—Thomas G Black
*Assistant Examiner*—Tuan C To
(74) *Attorney, Agent, or Firm*—Robert Desmond, Esq.

(57) ABSTRACT

A sensor error compensation system and method is provided that facilitates improved sensor error detection and compensation. The sensor error compensation system includes an expected value generator and a sensor fault detector. The expected value generator receives sensor data from a plurality of sensors in a turbine engine. From the sensor data, the expected value generator generates an expected sensor value for a sensor under test. The expected sensor value is passed to the sensor fault detector. The sensor fault detector compares the expected sensor value to a received sensor value to determine if a sensor error has occurred in the sensor under test. If an error has occurred, the error can be compensated for by generating a replacement sensor value to substitute for erroneous received sensor value.

40 Claims, 6 Drawing Sheets

SENSOR ERROR DETECTION AND COMPENSATION SYSTEM AND METHOD

FIELD OF THE INVENTION

This invention generally relates to diagnostic systems, and more specifically relates to sensor fault detection in turbine engines.

BACKGROUND OF THE INVENTION

Modern aircraft are increasingly complex. The complexities of these aircraft have led to an increasing need for fault detection systems. These fault detection systems are designed to monitor the various systems of the aircraft in an effort to detect potential faults. These systems are designed to detect these potential faults such that the potential faults can be addressed before the potential faults lead to serious system failure and possible in-flight shutdowns, take-off aborts, and delays or cancellations.

Engines are, of course, a particularly critical part of the aircraft. As such, fault detection for aircraft engines are an important part of an aircrafts fault detection system. Engine sensors play a critical role in fault detection. Typical modem turbine engine systems include several sets of engine sensors, such as engine speed sensors, fuel sensors, pressure sensors and temperature sensors. These sensors provide critical data to the operation of the turbine engine, and provide the core data used in fault detection.

Because of the critical importance of turbine engine sensors there is a strong need for sensor performance validation and compensation. Sensor validation generally includes fault detection and isolation, the determination of when one of the sensors is faulty and the isolation of which particular sensor in a group of sensor is at fault. Current practice in sensor fault detection generally relies upon range and rate checks for individual sensors. This technique, while acceptable for some circumstances, may not be able to consistently detect engine sensor faults that can occur, especially in-range sensor faults. Likewise, the current practice of fault isolation relies upon qualitative cause-effect relationships based on design documents and expressed in terms of fault trees. These qualitative cause-effect relationships are typically based on a baseline of a new engine, and thus can become obsolete as sensor aging, engine wear, deterioration and other variations cause inconsistencies in sensor readings. Thus, the current systems used for sensor fault detection and isolation have had limited effectiveness.

Thus, what is needed is an improved system and method for detecting and isolating sensor faults in turbine engines.

BRIEF SUMMARY OF THE INVENTION

The present invention provides a sensor error compensation system and method that provides improved sensor anomaly detection and compensation. The sensor error compensation system includes an expected value generator and a sensor fault detector. The expected value generator receives sensor data from a plurality of sensors in a turbine engine. From the sensor data, the expected value generator generates an expected sensor value for a sensor under test. The expected sensor value is passed to the sensor fault detector. The sensor fault detector compares the expected sensor value to a received sensor value to determine if a sensor error has occurred in the sensor under test. If an error has occurred, the error can be compensated for by generating a replacement sensor value to substitute for erroneous received sensor value.

In one embodiment, the expected value generator comprises an auto-associative model configured to generate expected sensor values from the plurality of sensor values received from the engine sensors. In another embodiment, the expected value generator comprises a hetero-associative model that is configured to generate an expected sensor value from a plurality of sensor values from other The foregoing and other objects, features and advantages of the invention will be apparent from the following more particular description of a preferred embodiment of the invention, as illustrated in the accompanying drawings.

BRIEF DESCRIPTION OF DRAWINGS

The preferred exemplary embodiment of the present invention will hereinafter be described in conjunction with the appended drawings, where like designations denote like elements, and.

DETAILED DESCRIPTION OF THE INVENTION

The present invention provides a sensor error compensation system and method that provides improved sensor error detection and compensation. The sensor error compensation system receives sensor values and generates an expected sensor value for a sensor under test. The expected sensor value is compared to a received sensor value to determine if a sensor error has occurred in the sensor under test.

Figure 1:
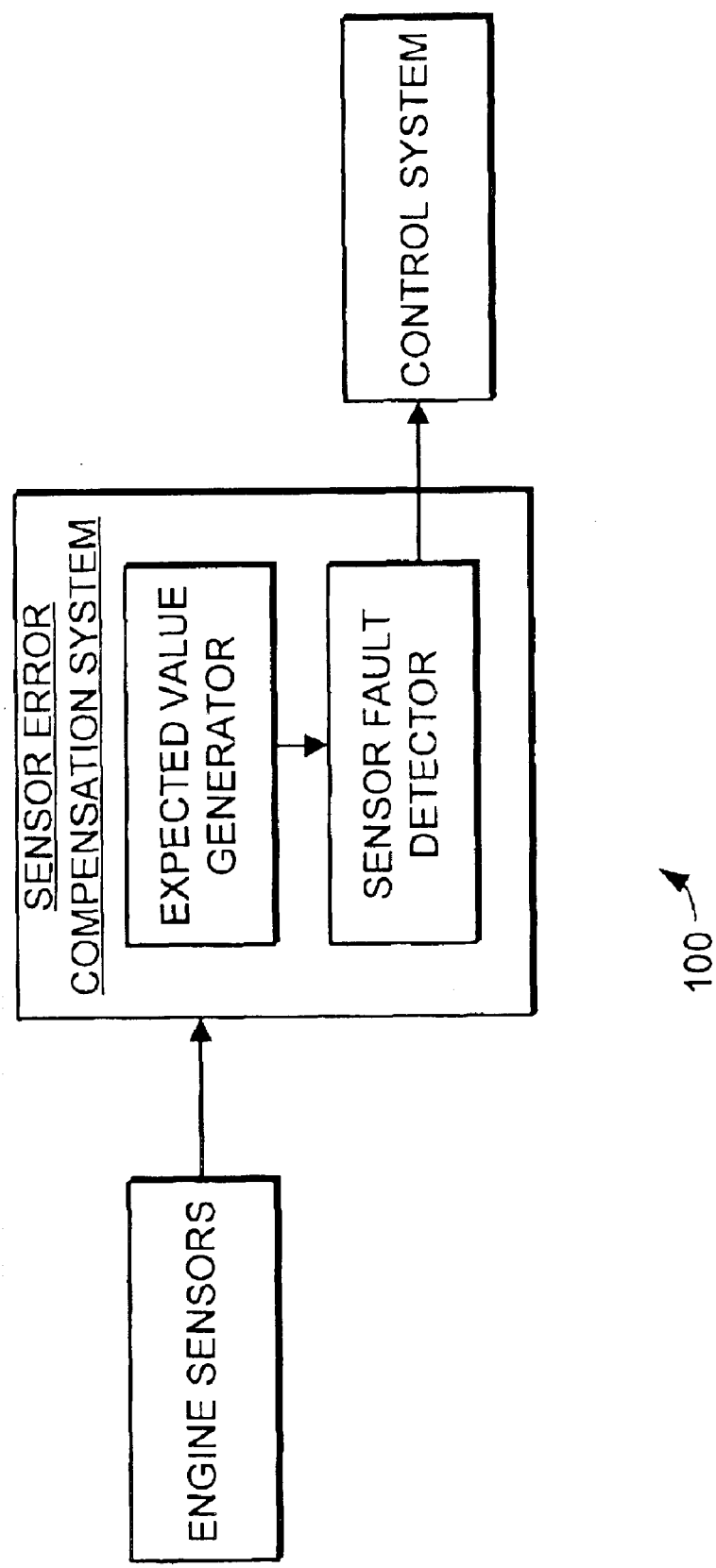
FIG. 1 is a schematic view of a sensor error compensation system.

Turning now to FIG. 1, a sensor error compensation system 100 for engine systems is illustrated. The sensor error compensation system 100 includes an expected value generator and a sensor fault detector. The expected value generator receives sensor data from a plurality of sensors in a turbine engine. From the sensor data, the expected value generator generates an expected sensor value for a sensor under test. The expected sensor value is passed to the sensor fault detector. The sensor fault detector compares the expected sensor value to a received sensor value to determine if a sensor error has occurred in the sensor under test. If an error has occurred, the error can be compensated for by generating a replacement sensor value to substitute for faulty sensor value. Thus, the sensor error compensation system 100 can compensate for engine sensor errors.

The sensor error compensation system 100 can compensate for errors in a wide variety of engine sensors. Typical modern turbine engine systems include several sets of engine sensors, such as engine speed sensors, fuel sensors, pressure sensors and temperature sensors. These sensors provide critical data to the operation of the turbine engine, and provide the core data used in fault detection. The sensor error compensation system 100 can detect and correct errors in these and other types of sensors typically used in turbine engines.

In one embodiment, the expected value generator comprises an auto-associative model configured and trained to generate expected sensor values from a received plurality of sensor values. In another embodiment, the expected value generator comprises a hetero-associative model that is configured to generate an expected sensor value from a plurality of sensor values from other sensors. In each of these embodiments, the sensor error compensation system uses the expected value generator to detect and correct sensor errors.

Figure 2:
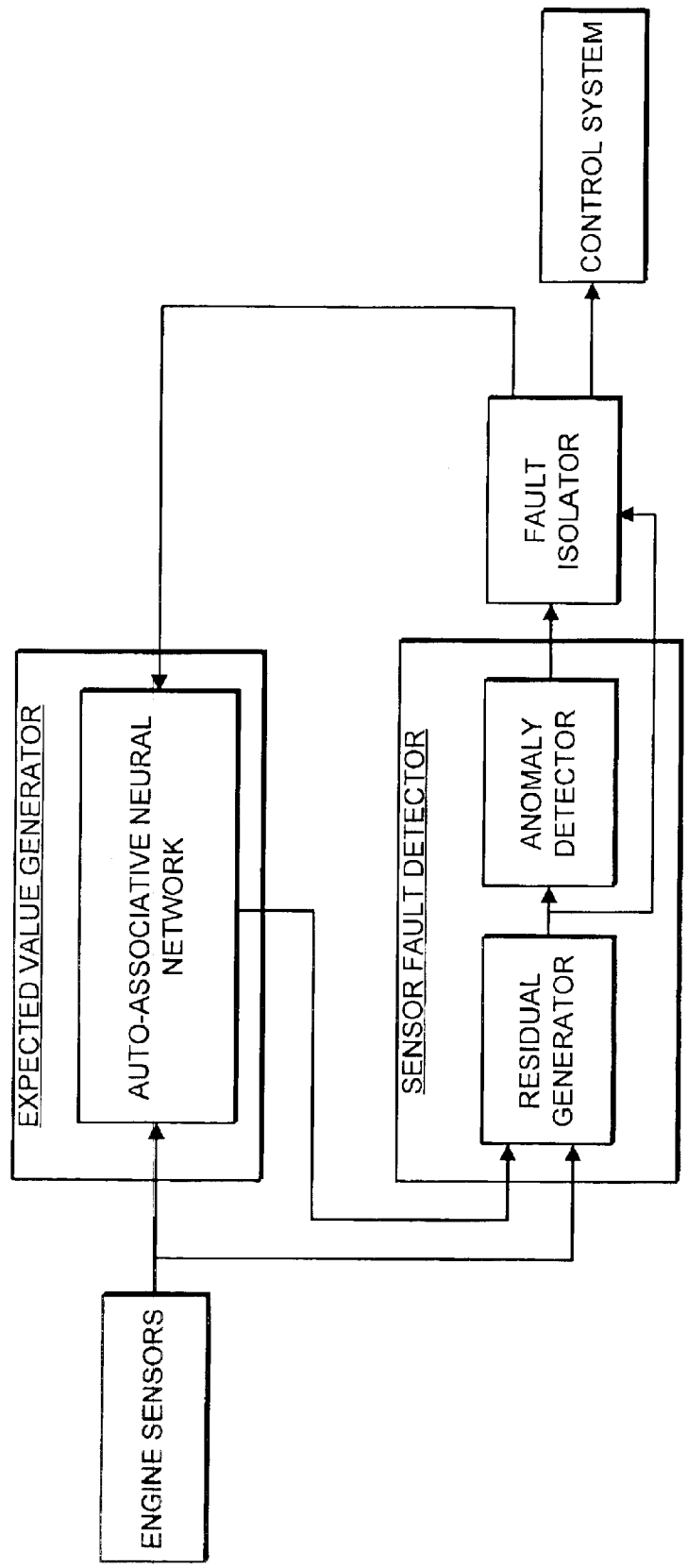
FIG. 2 is a schematic view of an exemplary sensor error compensation that includes an auto-associative model.

Turning now to FIG. 2, a sensor error compensation system 200 that utilizes an auto-associative model as is illustrated. In this embodiment, the expected value generator comprises an auto-associative model and the sensor fault detector comprises a residual generator and anomaly detector. Additionally, the sensor error compensation system 200 includes a fault isolator to isolate which sensors are faulty.

In this embodiment, the auto-associative model generates expected senor values. Specifically, the expected value generator receives sensor values from each of a plurality of turbine engine sensors and generates a plurality of expected sensor values from the associative model, with each of the expected sensor values corresponding to one of the plurality of received sensor values. Thus, the model auto-associates the received sensor values with themselves to create a corresponding plurality of expected values. Stated another way, an auto-associative model is a many-to-many framework where many sensors are used as input to validate all or some of the same input sensors.

The expected sensor values are passed to the residual generator in the sensor fault detector. The residual generator compares expected values with the actual received values, and generates residuals values indicating the difference between the expected values and the received values. These residuals are passed to the anomaly detector. The anomaly detector evaluates the residuals to determine if any are indicative of a likely fault in one or more of the sensors. For example, each residual is compared to a corresponding threshold value, with residuals above the corresponding threshold deemed to be indicative of a potential fault in a sensor. These detected anomalies are then passed to the fault isolator.

The sensor fault isolator determines which if any sensors in the system are at fault. In many cases, sensors with the largest residual values will be at fault. This will not be true in all cases however. To further isolate the fault, the received sensor value for a potentially faulty sensor is replaced at the input to the expected value generator with the previously generated corresponding expected value. The expected value generator then generates a new expected value for the potentially faulty sensor based on the received sensor values and the one replaced sensor value. The new expected value can then be analyzed to determine if the potentially faulty sensor was in fact the faulty sensor. If replacing the potentially faulty value with the expected value reduces the residuals, then the replaced value was in fact faulty. If instead, the residuals rise or do not change, then the potentially faulty sensor was not the faulty sensor. In this case, additional sensor values would be replaced at the input of the expected value generator with their corresponding expected values, and new expected values generated until the faulty sensor is isolated.

With the faulty sensor isolated, the faulty sensor values can be replaced in the system with a corrected value. Generally, the corrected value is derived from the expected values created by the expected value generator. By repeatedly feeding back expected values for the faulty sensor into the expected value generator, a replacement value can be created using iterative associative model estimation feedback. Specifically, an expected value is fed back into the generator and new expected value created until it converges to the non-faulty nominal value. This iterative process generates very accurate recovered values, and these recovered values can then replace the faulty sensor values in the system.

With the replacement values generated, the system provides the replacement values to the engine control logic for using in controlling engine operation and for sensor fault annunciation.

Figure 3:
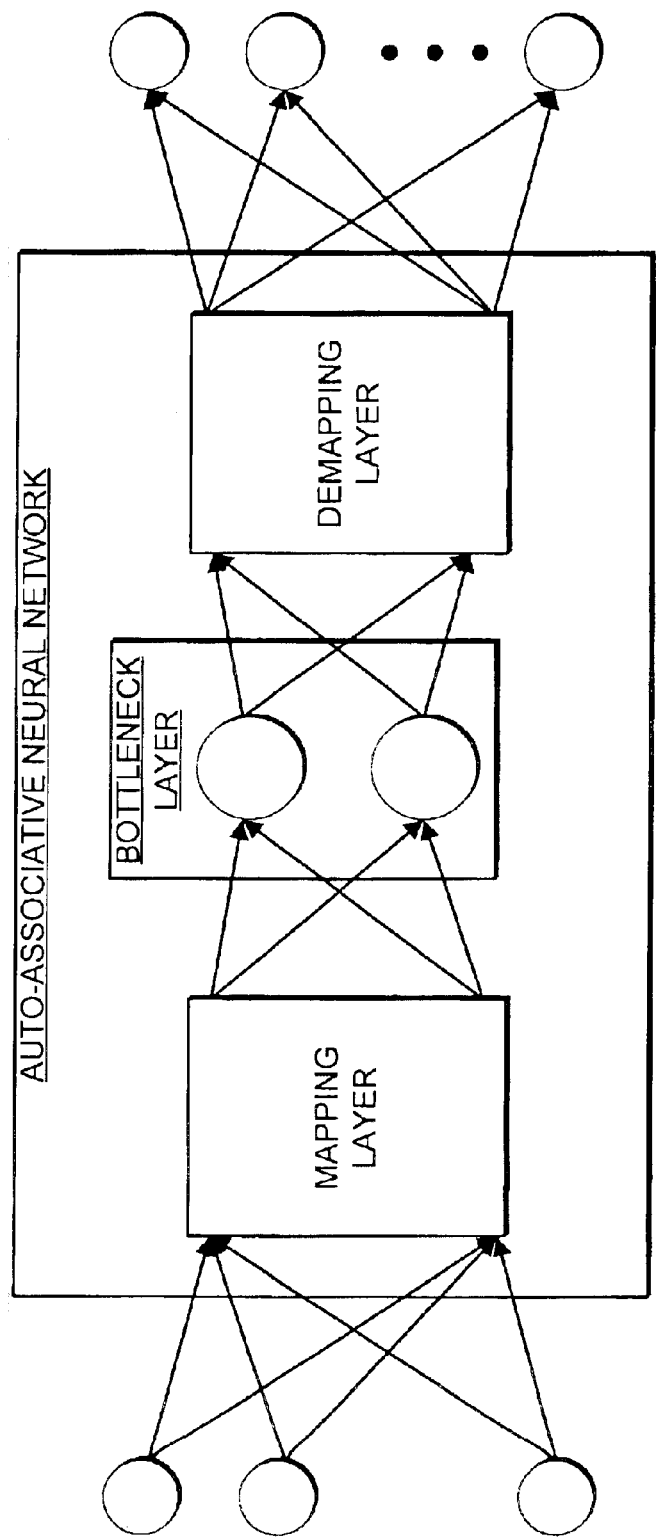
FIG. 3 is a schematic view of an auto-associative neural network.

Turning now to FIG. 3, an exemplary auto-associative model is illustrated. Specifically, FIG. 3 illustrates an auto-associative neural network 300 used to implement an auto-associative model in an expected value generator. The exemplary auto-associative neural network 300 comprises a multi-layered neural network that includes a mapping layer, a bottle-neck layer and a demapping layer.

In general, neural networks are data processing systems that are not explicitly programmed. Instead, neural networks are trained through exposure to real-time or historical data. Neural networks are characterized by powerful pattern matching and predictive capabilities in which input variables interact heavily. Through training, neural networks learn the underlying relationships among the input and output variables, and form generalizations that are capable of representing any nonlinear function. As such, neural networks are a powerful technology for nonlinear, complex classification problems.

In the illustrated embodiment, the auto-associative neural network 300 comprises a mapping layer, a bottleneck layer and a demapping layer. The bottleneck layer is a small dimensional layer between the mapping layer and demapping layer. The bottleneck layer can be used to ensure that neural network obtains good generalization and prevents the network from forming a look-table. In a one exemplary implementation, the mapping and demapping layers would have approximately 1.25 times the number of nodes present at the input, and the bottleneck layer would have one half the size of the input layer. For example, for a 7 sensor group, the auto-associative neural network can be set up to have 7 nodes at its input and output, 3 nodes at the bottleneck layer, and 9 nodes at the mapping and demapping layers.

The auto-associative neural network 300 is trained to receive a plurality of sensor values and generate a corresponding plurality of expected sensor values. In general, the goal in training the neural network is to reproduce the input sensor values at the output as closely as possible when the input sensor values do not contain any faulty sensor values, while also having the network output non-faulty sensor values even when the sensor is faulty. The first part of this goal is met by having the neural network configured to be very sensitive to changes in input sensor values while the latter part is met by having the network discard faulty sensor values and make up for the faulty sensor values based on the other sensor values.

The auto-associative neural network can be trained to meet both goals with a two phase training scheme. In the first phase, the neural network is trained with non-faulty data to learn to associate the expected value output with the good sensor values it is presented with at input. This first phase of training results in the neural network configured to fulfill the first goal.

The second phase of training is preferably accomplished by freezing the weights between the bottleneck and the de-mapping layer, and the weights between the demapping layer and the output layer. Thus, only the weights in the first two layers of the neural network are adapted in the second phase of training. This training procedure exploits the fact that the main features embedded in the input data are extracted by the neural networks bottleneck layer and that the final output is based on the values that the neurons in the bottleneck layer take. Hence, by mapping part of the neural network to learn to produce the main features of good sensor data from the faulty and noisy data the neural network can be trained to satisfy both goals.

The second phase of training is preferably done with white noise added to the input sensor values to achieve good generalization in a larger operational envelope. Thus trained, the trained neural network will not only output expected sensor values that are very close to the input sensor values when all the inputs are non-faulty, it will also develop a convex mapping of sensor inputs with one faulty sensor value to all non-faulty sensor values.

One type of training method that can be used is a Levenberg-Marquardt backpropagation algorithm used in batch mode. Other types of training methods that can be used include the variations of gradient descent algorithm by including heuristics or by optimization approaches.

Figure 4:
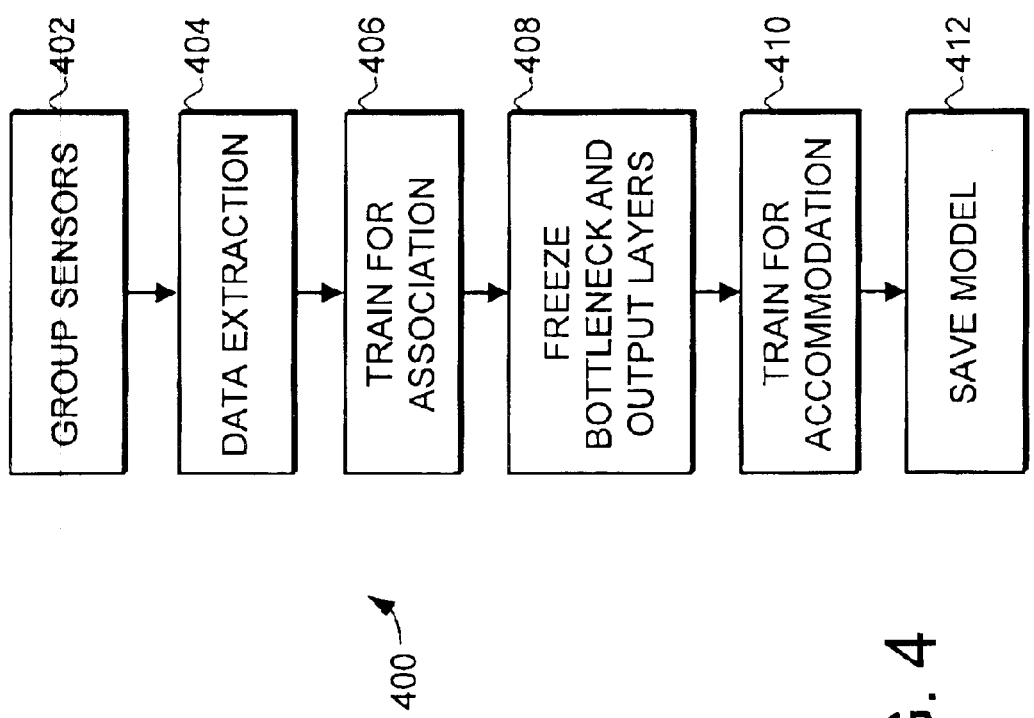
FIG. 4 is an flow diagram of an neural network training methods.

Turning now to FIG. 4, a method 400 for training an auto-associative neural network is illustrated. The training method 400 trains the auto-associative neural network to generate expected sensor values when presented with a plurality of inputted sensor values.

The first step 402 is to group the sensors based on a correlation analysis. The correlation analysis is performed in order to categorize sensors into related groups such that sensors belong to the same group are related. These related sensors in the group will then constitute the basis for generating expected values for the sensors in the group that are to be validated. A detailed example of one type of correlation analysis technique that can be used will be discussed below.

The next step 404 is extract the data used to train and validate the neural network. The data is preferably split into training, validation and test data sets. The training data set is used to train for association between inputs and outputs using a suitable method. The validation data set is used to determine an optimum number of iterations over the training data to achieve good generalization. The test data sets are then used to asses the prediction accuracy of the trained network.

The next step 406 is to train the neural network for association between inputs and outputs. This can be done using any suitable training method. One exemplary suitable training method is the Levenberg-Marquardt backpropagation algorithm. The training is preferably continued until the input is within a predetermined association threshold of the output when tested with the validation data set. This threshold is preferably determined based on the inherent noise measured during a noise analysis. The input and output association should be within the nominal range of variation of each sensor during a normal operation. A more detailed explanation of a specific noise analysis technique that can be used will be discussed below.

The next step 408 is to freeze the weights in the bottleneck and output layers. Freezing the bottleneck and output layers ensures that the accommodation training only updates the weights in the first two layers. Having already trained for association, the bottleneck layer represents the features that describe the nominal data. By preserving the mapping from the features to nominal values, the association is maintained for generating expected values from possibly faulty input data.

The next step 410 is to train for accommodation of the faulty sensors. In this step the training data is expanded to include faulty sensor data or white noise can be added to the nominal data to simulate faults. Generally, it is desirable for the maximum offset of the faulty data to be between 5 and 10 standard deviations. Again, the weights in the bottleneck and output layers were first frozen to ensure that the accommodation training only updates the weights in the first two layers. The training for accommodation is then preferably continued until an error condition threshold is satisfied. The error condition threshold is generally determined based on the nominal range of variation in sensor values. The error condition threshold is generally slightly larger than the association threshold because the neural network is now used for mapping for association as well as for accommodation.

The last step 412 is to save the neural network model in a way that can implement the expected value generator. Thus, by training the neural network an auto-associative model can be provided to implement an effective expected value generator. FIGS. 3 and 4 thus illustrate an auto-associative neural network and training method that can be used as an expected value generator, configured and trained to generate expected sensor values from the plurality of sensor values received from the engine sensors.

Figure 5:
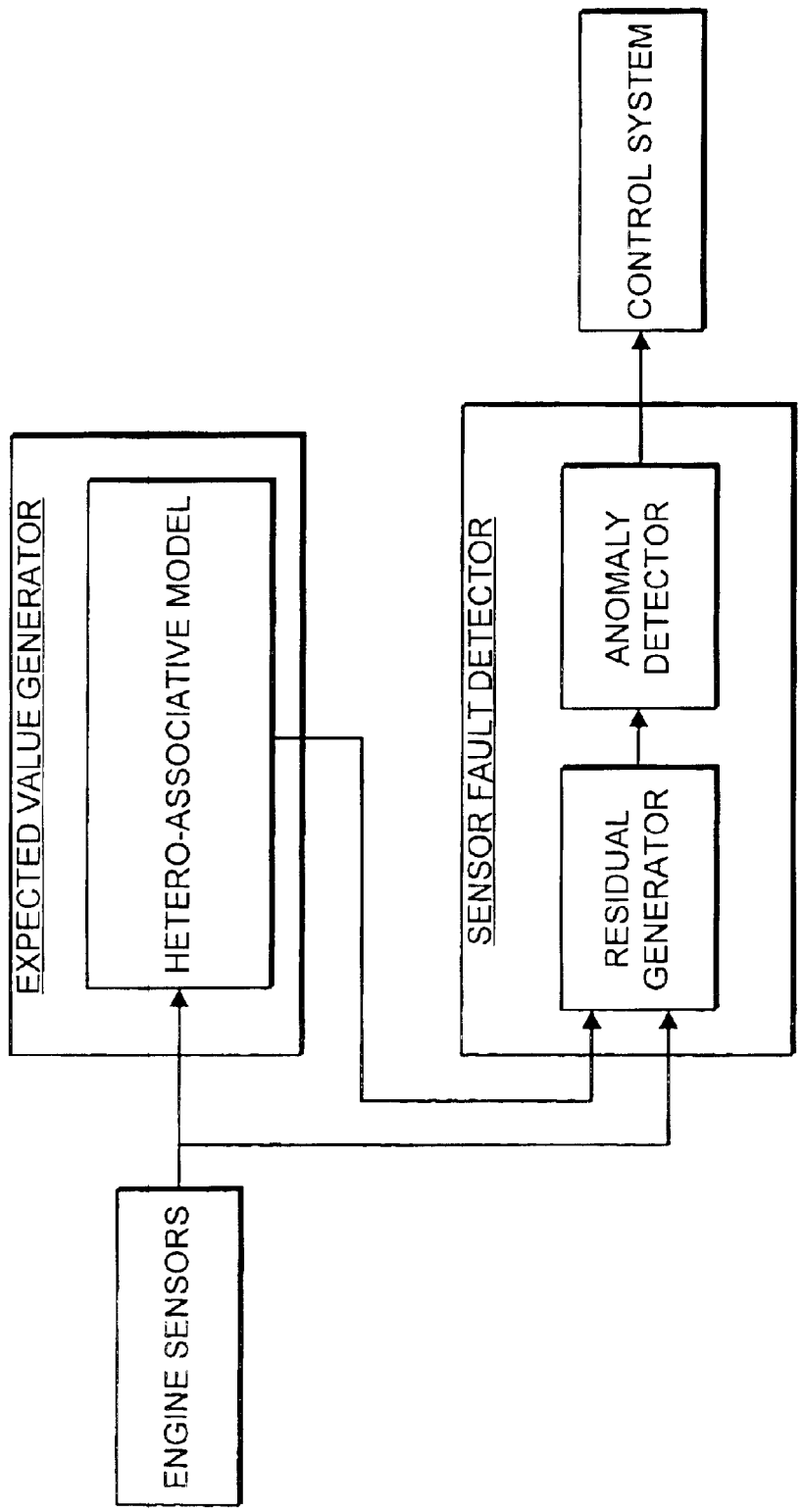
FIG. 5 is a schematic view of an exemplary sensor error compensation that includes an hetero-associative model.

Turning now to FIG. 5, a sensor error compensation system 500 that utilizes a hetero-associative model as is illustrated. In this embodiment, the expected value generator comprises a hetero-associative model and the sensor fault detector comprises a residual generator and anomaly detector.

In this embodiment, the hetero-associative model generates expected sensor values. Specifically, the expected value generator receives sensor values from a plurality of turbine engine sensors and from that model generates an expected value for another sensor in the system. Thus, unlike the auto-associative model, the hetero-associative model receives data for some sensors and uses that data to generate expected values for a different sensor. Stated another way, the hetero-associative model is many-to-one approach where many sensors are used to validate one other sensor. In a typical configuration, the expected value generator would include a plurality of hetero-associative models, one for each sensor that expected values are to be generated. For example, an expected value generator could include a hetero-associative model for all engine turbine sensors, or for all sensors of specific types, or for particular subsets of sensors. Each hetero-associative model can then generate expected values for its corresponding sensor.

Like system 300, the expected sensor values generated by the expected value generator are passed to the residual generator in the sensor fault detector. The residual generator compares expected values with the actual received values, and generates residuals values indicating the difference between the expected values and the received values. These residuals are passed to the anomaly detector. The anomaly detector evaluates the residuals to determine if any are indicative of a likely fault in one or more the sensors. For example, each residual is compared to a corresponding threshold value, with residuals above the corresponding threshold deemed to be indicative of a potential fault in a sensor.

With the faulty sensor detected, the faulty sensor values can be replaced in the system with a corrected value. Generally, the corrected value is derived from the expected values created by the expected value generator.

Like the auto-associative model, the hetero-associative model can be implemented with a neural network. In this embodiment, the hetero-associative neural network can comprise a three-layer feed-forward neural network that provides a many-to-one mapping. In a typical engine sensor application, a hetero-associative neural network implementation may include 6–8 input sensors, 10 hidden layer nodes and one output node. The hidden layer nodes can be implemented to have log-sigmoid transfer functions while the output nodes are implemented to have linear transfer functions. Additionally, as will be discussed in more detail below, the implementation can include a delay line for each input sensor to facilitate storage of sensor values for computation of later sensor values.

The hetero-associative neural network would preferably be trained using techniques similar to the auto-associative neural network. Specifically, the hetero-associative neural network can be trained with existing data sets to receive a plurality of sensor values and generate expected sensor values for its corresponding engine sensor.

One advantage to a hetero-associative neural network implementation is that a hetero-associative neural network is particularly suitable to applications where relationships between sensor values have strong time dependencies. That is, where different sensor types have relationships that are stronger with some amount of time difference between measurements.

As an example of these time dependencies, gas turbine engines are typically monitored with a variety of different sensor types, including pressure, temperature, flow rate and position sensors. These different types of sensors are used to monitor different modalities. Because of the difference in propagation of changes in the engine, the correlation among various sensors is higher when some sensor readings are delayed. In these cases, if only a snapshot of sensor values are used (i.e., only sensor values from the same time instant) the validation of those sensors that have longer time constants such as many temperature sensors would not be as reliable as needed in some cases. This issue is of particular concern during transient conditions such as startup, climb, descent, etc.

To account for this, the hetero-associative model can be implemented to store sensor values until they are used with other, later sensor values. This can be done by employing a large input layer (e.g. a shift register) at the input to the hetero-associative neural network. Thus, the expected sensor value can be generated with those sensor values that show the strongest correlation to the corresponding sensor. As one specific implementation example, the shift register is added to provide a delay line of 5 equally spaced units going back to 2 seconds in time for each input sensor sampled at 100 ms intervals. This provides the short-term memory for providing the temporal context for the current sensor data.

In general, such a model would be developed by identifying the sensors and the time differentials between sensors values that have the highest correlation. In training the hetero-associative neural network, the training data can be split into training and test sets according to the correlation time difference. Because the hetero-associative neural network can use delayed values at its input, special attention should be paid into the splitting of data. First, the output sensor data are split into training and test sets. Then the corresponding time samples of the input sensors along with the proper delayed values from those time samples should be extracted from the input sensor data set. The hetero-associative neural network can then be trained using any suitable technique, such as using backpropagation or faster converging variations such as Levenberg-Marquardt training algorithm. This training is preferably continued until the output error falls to within a predetermined threshold.

One advantage to a hetero-associative model is that fault isolation is not generally required. This is because a typical implementation using one hetero-associative model with one output for each engine sensor that an expected value is being generated. Thus, the anomaly detector need only to compare the estimated value with the actual received valued to determine if the difference exceeds a certain threshold. When the difference exceeds the threshold a fault is detected and the expected value can be used as a replacement for the faulty sensor value. Again, this threshold is preferably chosen using the inherent variation of the sensor readings at various flight regimes as computed during a noise analysis, with the threshold being increased until the desired balance is achieved between fault detection and false alarm rates.

Thus, the expected values generator can be implemented with a variety of models, including auto-associative and hetero-associative models. Generally, auto-associative models would be desirable when there is sufficiently large number of sensor that are highly correlated spatially at any given instant. Likewise, hetero-associative models would be desirable in those cases where on sensor correlates well with delayed values of several other sensors.

Furthermore, in some applications it may be desirable to include both auto-associative and hetero-associative models in the expected value generator. This would be the case if there are, for example, many pressure and flow sensors, but only a few temperature sensors. The hetero-associative models could then be employed for the temperature sensors while the remaining sensors are validated through the auto-associative models. As another example, inputs to the auto associative model could include snapshot data from the engine sensors as well as sensor values that were already validated through a hetero-associative model. Likewise, the input to the hetero-associative model could include spatial as well as temporal engine data. Furthermore, the delayed sensor values could be validated through the auto-associative model. Thus, the combined outputs of the auto-associative and hetero-associative models would combine to validate and recover the sensors.

As discussed above, both the auto-associative and hetero-associative models are preferably implemented with a data correlation analysis and noise analysis serving as the basis for the models. As one example, a correlation analysis is performed in order to categorize sensors into groups such that sensors belong to the same group are related. These related sensors in the group will then constitute the basis for generating expected values for the sensors in the group that are to be validated.

Similarly, noise analysis is preferably performed that involves computation of several statistical measures in order to reveal levels of noise inherently present in each of the sensors. These noise measures are then used for setting threshold values and defining the nominal range of the variation of sensor values.

The correlation analysis is preferably performed as part of engine development. During development, a large number of sensors are typically installed for the extensive testing necessary to develop a complex turbine engine. In contrast, a typical production engine includes only small subset of these sensors. This is typically a result of the drive to reduce cost and eliminate excessive weight in the engine. As one implementation of a correlation analysis, the large number of development sensors is used to categorize sensors into groups during model development. Specifically, sensors are grouped together with other sensors that can be used to predict the value of the other sensors. Stated another way, sensors are preferably grouped together into related groups that have high values of cross-correlation and cross-covariance.

As one example, a cross-correlation sequence can be statistical quantity defined as:

$$\gamma_{xy}(m) = E\{x_n y^*_{n+m}\} \quad (1)$$

where $x_n$ and $y_n$ are stationary random processes, $-\infty < n < \infty$ and $E\{\ \}$ is the expected value operator. The cross-covanance sequence can be calculated by first removing the mean and then estimating the cross-correlation sequence:

$$C_{xy}(m) = E\{(x_n - \mu_x)(y^*_{n+m} - \mu^*_y)\} \quad (2)$$

However, since typically only a finite-length record of random process in real-life applications is available, the following relation can be used to estimate the deterministic cross-correlation sequence (also called the time-ambiguity function):

$$R_{xy}(m) = \begin{cases} \sum_{n=0}^{N-|m|-1} x_n y^*_{n+m} & m \geq 0 \\ R^*_{xy}(-m) & m < 0 \end{cases} \quad (3)$$

where n=0, ..., N−1.

As a further example, calculations to estimate cross-covariance can be done with a Fast Fourier Transform (FFT) based algorithm to evaluate the sum given inputs $x_n$ and $y_n$ in length N. Such an FFT can be performed with a xcov function provided by MATLAB or other equivalent tool. The estimated cross-covariances can then be normalized to be 1 at the zero-lag by dividing the output by norm(x) and norm(y). In other words, the auto-correlation at the zero lag point is set to 1. The correlations can then be investigated with a maximwn lag envelope of [−50,50]. As an example, for K channels, a cross-covariance matrix of the size (50+50+1) by ($K^2$) is generated.

When such a correlation analysis is applied to sensor data, those sensors that have high correlation are grouped together. In addition, this method can determine the magnitude of the maximum correlation and the lag value at which the maximum is reached. This is useful in determining how far back in time one needs to go to use a highly correlated value as a basis for validating a sensor reading.

For example, in a typical turbine engine, the speed and pressure sensors react to any change in engine dynamics much quicker than temperature sensors since the propagation of heat takes longer. Hence, high correlation with temperature sensors occurs only after some delay.

The cross-covariance matrix can then be used to develop the model used to estimate sensor values. As one example, the list of related sensors is formed by analyzing the normalized cross-covariance matrix. Several slices of this three dimensional matrix are taken at various correlation levels such as 0.9, 0.8, and 0.7 by subtracting these numbers from the absolute values of the cross-covariance matrix. Those sensors whose correlation factors remain positive after each slice form a group. The slicing starts at 1 and continues down until each sensor is included in a group of at least 5 sensors. A similar process is also applied with various lag times to seek groups of sensors that are correlated in time. Once the groups are formed, the ones that are correlated spatially are inputted into auto-associative models, and the ones that are correlated temporally are inputted into hetero-associative models.

As stated above, a noise analysis is preferably performed to determine the level of noise inherent in each of the sensors. These noise measures are then used for setting threshold values and defining the nominal range of the variation of sensor values. Typically, the sensor data is made up of steady state and transient regions through several flight modes. The steady-state regions correspond to those with settled sensor values after certain load is applied or removed. The statistical characteristics of sensor data besides its mean are different in each mode. To determine an appropriate way to preprocess the raw data, and set expectations for sensor validation and fault detection so that the results can be assessed realistically, it is desirable to analyze the noise characteristics of the original sensor readings. Examples of the type of calculations that can be used to analyze the noise characteristics include: the mean, standard deviation, Z-score (which is a measure of the deviation from the mean normalized by the standard deviation), signal to noise ratio (which can be computed as mean divided by standard, and percent deviation (which can be computed as Z-Score divided by signal to noise ratio).

These statistical features can be calculated for load and no-load state regions for all modes of operation. For transient modes, a sliding window can be used to calculate the moving mean and other features. As an example, a sliding window width of 100 time frames can be used for data sampled at 100 Hz, 10 frames for data sampled at 10 Hz, and 5 frames for data sampled at 1 Hz.

These statistical features can then be used to determine anomaly detection thresholds. As one example implementation, once the statistical measures are computed for each time instant, one representative number is obtained for each sensor through the following procedure. First a mode is selected (transient or steady-state) that shows the larger overall standard deviation. It would be the transient in most cases. Second, the standard deviations and percent deviations are ranked for that mode for each sensor. Third, the ones at the 10 percentile are selected to be the representative number. This number would then be a conservative (smaller) estimate of the nominal variation out of a liberal (higher) variation region, and would be a good candidate for anomaly detection thresholds.

Figure 6:
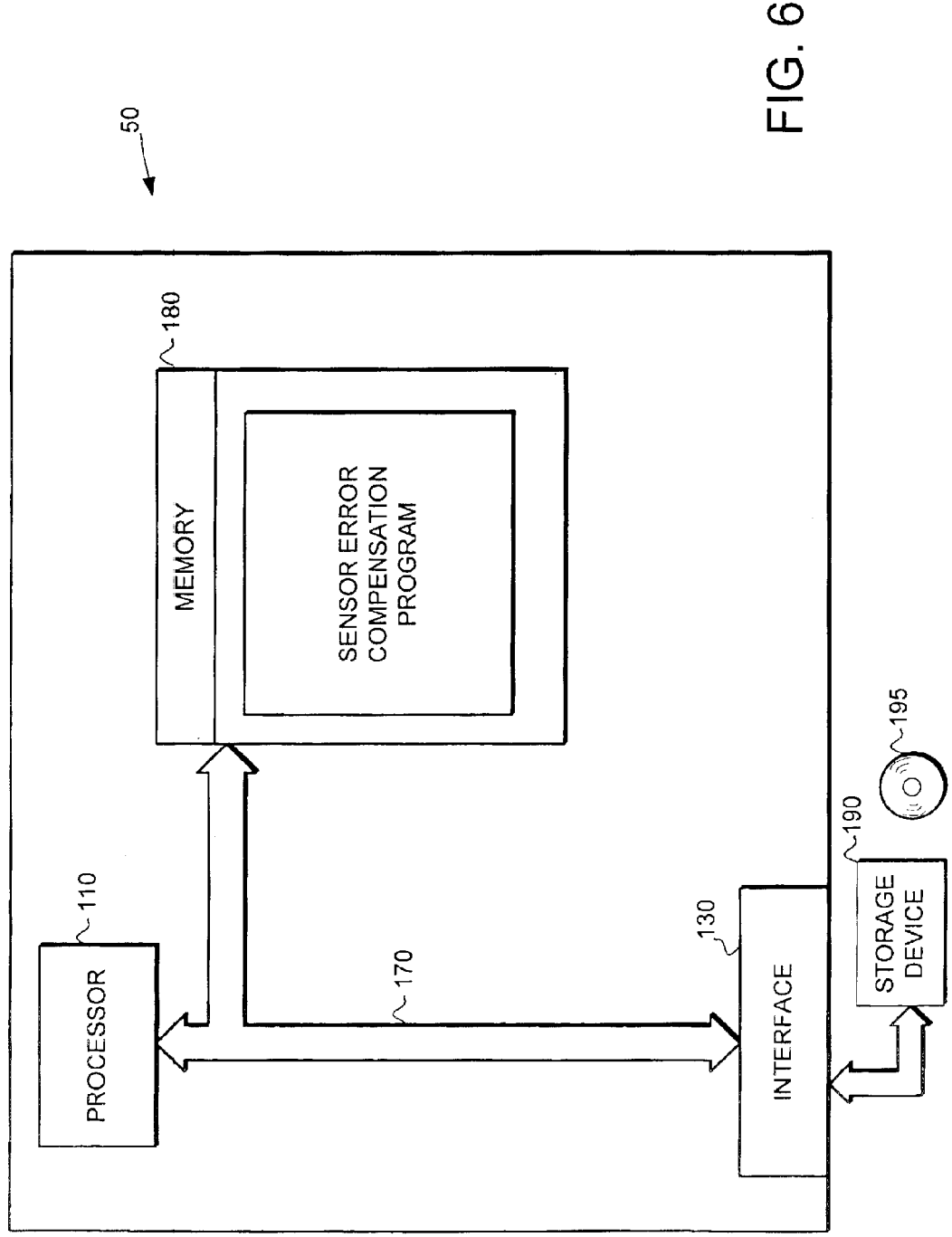
FIG. 6 is a schematic view of a computer system that includes a sensor error compensation program.

The sensor error compensation system and method can be implemented in wide variety of platforms. Turning now to FIG. 6, an exemplary computer system 50 is illustrated. Computer system 50 illustrates the general features of a computer system that can be used to implement the invention. Of course, these features are merely exemplary, and it should be understood that the invention can be implemented using different types of hardware that can include more or different features. It should be noted that the computer system can be implemented in many different environments, such as onboard an aircraft to provide onboard diagnostics, or on the ground to provide remote diagnostics. The exemplary computer system 50 includes a processor 110, an interface 130, a storage device 190, a bus 170 and a memory 180. In accordance with the preferred embodiments of the invention, the memory system 50 includes a sensor error compensation program.

The processor 10 performs the computation and control functions of the system 50. The processor 110 may comprise any type of processor, include single integrated circuits such as a microprocessor, or may comprise any suitable number of integrated circuit devices and/or circuit boards working in cooperation to accomplish the functions of a processing unit. In addition, processor 110 may comprise multiple processors implemented on separate systems. In addition, the processor 110 may be part of an overall vehicle control, navigation, avionics, communication or diagnostic system. During operation, the processor 110 executes the programs contained within memory 180 and as such, controls the general operation of the computer system 50.

Memory 180 can be any type of suitable memory. This would include the various types of dynamic random access memory (DRAM) such as SDRAM, the various types of static RAM (SRAM), and the various types of non-volatile memory (PROM, EPROM, and flash). It should be understood that memory 180 may be a single type of memory component, or it may be composed of many different types of memory components. In addition, the memory 180 and the processor 110 may be distributed across several different computers that collectively comprise system 50. For example, a portion of memory 180 may reside on the vehicle system computer, and another portion may reside on a ground based diagnostic computer.

The bus 170 serves to transmit programs, data, status and other information or signals between the various components of system 100. The bus 170 can be any suitable physical or logical means of connecting computer systems and components. This includes, but is not limited to, direct hard-wired connections, fiber optics, infrared and wireless bus technologies.

The interface 130 allows communication to the system 50, and can be implemented using any suitable method and apparatus. It can include a network interfaces to communicate to other systems, terminal interfaces to communicate with technicians, and storage interfaces to connect to storage apparatuses such as storage device 190. Storage device 190 can be any suitable type of storage apparatus, including direct access storage devices such as hard disk drives, flash systems, floppy disk drives and optical disk drives. As shown in FIG. 6, storage device 190 can comprise a disc drive device that uses discs 195 to store data.

In accordance with the preferred embodiments of the invention, the computer system 50 includes the sensor error compensation program. Specifically during operation, the sensor error compensation program is stored in memory 180 and executed by processor 110. When being executed by the processor 110, the sensor error compensation program validates sensor outputs and provides replacement sensor values.

It should be understood that while the present invention is described here in the context of a fully functioning computer system, those skilled in the art will recognize that the mechanisms of the present invention are capable of being distributed as a program product in a variety of forms, and that the present invention applies equally regardless of the particular type of signal bearing media used to carry out the distribution. Examples of signal bearing media include: recordable media such as floppy disks, hard drives, memory cards and optical disks (e.g., disk 195), and transmission media such as digital and analog communication links, including wireless communication links.

The present invention thus provides a sensor error compensation system and method that provides improved sensor error detection and compensation. The sensor error compensation system includes an expected value generator and a sensor fault detector. The expected value generator receives sensor data from a plurality of sensors in a turbine engine. From the sensor data, the expected value generator generates an expected sensor value for a sensor under test. The expected sensor value is passed to the sensor fault detector. The sensor fault detector compares the expected sensor value to a received sensor value to determine if a sensor error has occurred in the sensor under test. If an error has occurred, the error can be compensated for by generating a replacement sensor value to substitute for erroneous received sensor value.

The embodiments and examples set forth herein were presented in order to best explain the present invention and its particular application and to thereby enable those skilled in the art to make and use the invention. However, those skilled in the art will recognize that the foregoing description and examples have been presented for the purposes of illustration and example only. The description as set forth is not intended to be exhaustive or to limit the invention to the precise form disclosed. Many modifications and variations are possible in light of the above teaching without departing from the spirit of the forthcoming claims.

What is claimed is:

1. A sensor error compensation system for compensating sensor errors in a turbine engine, the sensor error compensation system comprising:

an expected value generator, the expected value generator receiving sensor data from a plurality of turbine engine sensors and generating an expected sensor value for a sensor under test; and a sensor fault detector, the sensor fault detector comparing the sensor expected value to a received sensor value for the sensor under test to determine if a sensor error has occurred in the sensor under test.

2. The system of claim 1 wherein the sensor error compensation system further generates a replacement sensor value to substitute for the received sensor value.

3. The system of claim 2 wherein the replacement sensor value is generated from the expected sensor value.

4. The system of claim 3 wherein the replacement sensor value is generated from the expected sensor value by the expected value generator generating a new expected sensor value based on the expected sensor value as an input.

5. The system of claim 1 wherein the expected value generator comprises an auto-associative neural network, and wherein the sensor under test comprises one of the plurality of turbine engine sensors.

6. The system of claim 1 wherein the expected value generator comprises hetero-associative neural network, and wherein the sensor under test comprises an additional turbine engine sensor.

7. The system of claim 1 wherein the expected value generator generates a new expected value using the expected value as an input to isolate the sensor under test from the plurality of turbine engine sensors.

8. The system of claim 1 wherein the expected value generator comprises an auto-associative neural network, and wherein the auto-associative neural network includes a mapping layer, a bottleneck layer and a demapping layer.

9. The system of claim 8 wherein the auto-associative neural network is first trained for association using nominal sensor values, the demapping layer is then fixed and the neural network is trained with faulty sensor values.

10. The system of claim 1 wherein the expected value generator includes a model based on groupings of the plurality of turbine engine sensors into related groups.

11. The system of claim 10 wherein the groupings of the plurality of turbine engine sensors is based upon a time dependent correlation.

12. A method of compensating for sensor errors in a turbine engine, the method comprising the steps of:

a) receiving a plurality of sensor values from a plurality of sensors;

b) generating an expected sensor value from the plurality of sensor values;

c) comparing the expected sensor value to a received sensor value from a sensor under test; and d) replacing the received sensor value with a replacement sensor value if a sensor error in the sensor under test has occurred.

13. The method of claim 12 wherein the step of generating an expected sensor value from a plurality of sensor values comprises generated the expected sensor value with an auto-associative neural network, and wherein the sensor under test comprises one of the plurality of turbine engine sensors.

14. The method of claim 13 wherein the step of generating an expected sensor value from a plurality of sensor values comprises inputting the plurality of sensor values into the auto-associative neural network and processing the plurality of sensor values through a mapping layer, bottleneck layer and demapping layer in the auto-associative neural network.

15. The method of claim 12 wherein the step of generating an expected sensor value from a plurality of sensor values comprises generated the expected sensor value with hetero-associative neural network.

16. The method of claim 12 further comprising the step of isolating the sensor under test from the plurality of turbine engine sensors.

17. The method of claim 16 wherein the step of isolating the sensor under test from the plurality of turbine engine sensors comprises generating a new expected value using the expected value as an input.

18. The method of claim 12 wherein the step of comparing the expected sensor value to a received sensor value from a sensor under test comprises determining a residual difference between the expected sensor value and the received sensor value.

19. The method of claim 12 wherein the step of replacing the received sensor value with a replacement sensor value comprises the step of generating the replacement sensor value from the expected sensor value.

20. The method of claim 19 wherein the step of generating the replacement sensor value from the expected sensor value comprises generating a new expected sensor value using the expected sensor value as an input.

21. An apparatus comprising:
 a) a processor;
 b) a memory coupled to the processor;
 c) a sensor error compensation program residing in the memory and being executed by the processor, the sensor error compensation program including:
  an expected value generator, the expected value generator receiving sensor data from a plurality of turbine engine sensors and generating an expected sensor value for a sensor under test; and
  a sensor fault detector, the sensor fault detector comparing the sensor expected value to a received sensor value for the sensor under test to determine if a sensor error has occurred in the sensor under test.

22. The apparatus of claim 20 wherein the sensor error compensation program further generates a replacement sensor value to substitute for the received sensor value.

23. The apparatus of claim 22 wherein the replacement sensor value is generated from the expected sensor value.

24. The apparatus of claim 23 wherein the replacement sensor value is generated from the expected sensor value by the expected value generator generating a new expected sensor value based on the expected sensor value as an input.

25. The apparatus of claim 20 wherein the expected value generator comprises an auto-associative neural network, and wherein the sensor under test comprises one of the plurality of turbine engine sensors.

26. The apparatus of claim 20 wherein the expected value generator comprises hetero-associative neural network, and wherein the sensor under test comprises an additional turbine engine sensor.

27. The apparatus of claim 20 wherein the expected value generator generates a new expected value using the expected value as an input to isolate the sensor under test from the plurality of turbine engine sensors.

28. The apparatus of claim 20 wherein the expected value generator comprises an auto-associative neural network, and wherein the auto-associative neural network includes a mapping layer, a bottleneck layer and a demapping layer.

29. The apparatus of claim 28 wherein the auto-associative neural network is first trained for association using nominal sensor values, the demapping layer is then fixed and the neural network is trained with faulty sensor values.

30. A program product comprising:
 a) a sensor error compensation program, the sensor error compensation program including:
  an expected value generator, the expected value generator receiving sensor data from a plurality of turbine engine sensors and generating an expected sensor value for a sensor under test; and
  a sensor fault detector, the sensor fault detector comparing the sensor expected value to a received sensor value for the sensor under test to determine if a sensor error has occurred in the sensor under test; and
 b) signal bearing media bearing said program.

31. The program product of claim 30 wherein the signal bearing media comprises recordable media.

32. The program product of claim 30 wherein the signal bearing media comprises transmission media.

33. The program product of claim 30 wherein the sensor error compensation program further generates a replacement sensor value to substitute for the received sensor value.

34. The program product of claim 33 wherein the replacement sensor value is generated from the expected sensor value.

35. The program product of claim 34 wherein the replacement sensor value is generated from the expected sensor value by the expected value generator generating a new expected sensor value based on the expected sensor value as an input.

36. The program product of claim 30 wherein the expected value generator comprises an auto-associative neural network, and wherein the sensor under test comprises one of the plurality of turbine engine sensors.

37. The program product of claim 30 wherein the expected value generator comprises hetero-associative neural network, and wherein the sensor under test comprises an additional turbine engine sensor.

38. The program product of claim 30 wherein the expected value generator generates a new expected value using the expected value as an input to isolate the sensor under test from the plurality of turbine engine sensors.

39. The program product of claim 30 wherein the expected value generator comprises an auto-associative neural network, and wherein the auto-associative neural network includes a mapping layer, a bottleneck layer and a demapping layer.

40. The program product of claim 39 wherein the auto-associative neural network is first trained for association using nominal sensor values, the demapping layer is then fixed and the neural network is trained with faulty sensor values.

* * * * *